July 9, 1957 G. O. LANGER 2,799,013

SWITCHING CIRCUIT

Filed Oct. 29, 1954

INVENTOR.
George O. Langer

BY Morris [signature]

ATTORNEY.

2,799,013
Patented July 9, 1957

2,799,013

SWITCHING CIRCUIT

George O. Langer, Pennsauken, N. J., assignor to Radio Corporation of America, a corporation of Delaware Application October 29, 1954, Serial No. 465,659
9 Claims. (Cl. 340—213)

The present invention relates to switching circuits, and more particularly, to a circuit arrangement for alternatively switching current to either one of two current responsive devices according to the condition of a binary sensing element.

There presently is a need for simple and effective systems for switching current on and off in any selected electrical device, element or circuit. The development of high speed computing systems has intensified the demand for such switching systems. In computing systems, a binary code is commonly employed. This binary code is characterized by the use of only two digital values. Alternative states or conditions of electrical circuit elements may be used to represent these digital values. For example, conduction and nonconduction in an electrical device may represent the two binary digital values.

Previous efforts to obtain conduction or nonconduction in electrical circuit elements by means of complicated electronic circuits or relay devices are well known in the art. Consider, for example, the often occurring problem of expressing the binary states in terms of conduction or nonconduction in two circuit elements. This problem may be more precisely stated as converting a single binary representation into a dual binary representation. It will be apparent that a relay actuated device can be used to alternatively cause conduction in any one of two current responsive devices. This would thereby provide a dual binary representaton. However, relay operation is to be avoided, if possible, because of the maintenance requirements of mechanical relays.

According to the present invention, a bridge circuit is developed which alternatively switches current to either of two current responsive devices according to the position of a binary sensing element. This circuit arrangement may have high speed operating characteristics if desired. Furthermore, equal currents may be switched through any of the two current responsive elements. The binary sensing element, several passive impedance elements, and the current responsive elements are arranged in a bridge circuit having four arms and a detector arm. The detector arm is located between oppositely disposed junctions of adjacent ones of the four arms. One of the impedance elements is connected in each arm. The sensing element is connected in series with an impedance element in one of the arms. One of the current responsive elements is connected in series with one of the impedance elements. This series circuit combination of an impedance element and a current responsive element is then connected across the impedance element in the arm containing the sensing element. The other current responsive element is connected in the detector arm of the bridge.

With the sensing element positioned according to a binary code in a circuit closing condition, the bridge is balanced and a response is obtained from the current responsive element in series with this sensing element. On assuming an alternative, circuit interrupting condition, the sensing element causes a response from the current responsive element in the detector arm of the bridge.

The response from the other current responsive device is thereby terminated.

It is, therefore, an object of this invention to provide a novel switching circuit.

It is another object of this invention to provide a dual binary response.

It is a further object of the present invention to provide a switching circuit which effects two alternative binary responses to each of two conditions of a binary sensing element.

It is a still further object of the present invention to provide a switching circuit for use in a binary switching system.

It is a still further object of the present invention to provide a simple, inexpensive and effective switching circuit.

Other objects and advantages of the present invention will, of course, become apparent and immediately suggest themselves to those skilled in the art to which the invention is directed from a reading of the following specification in connection with the accompanying drawing in which.

Figure 1:
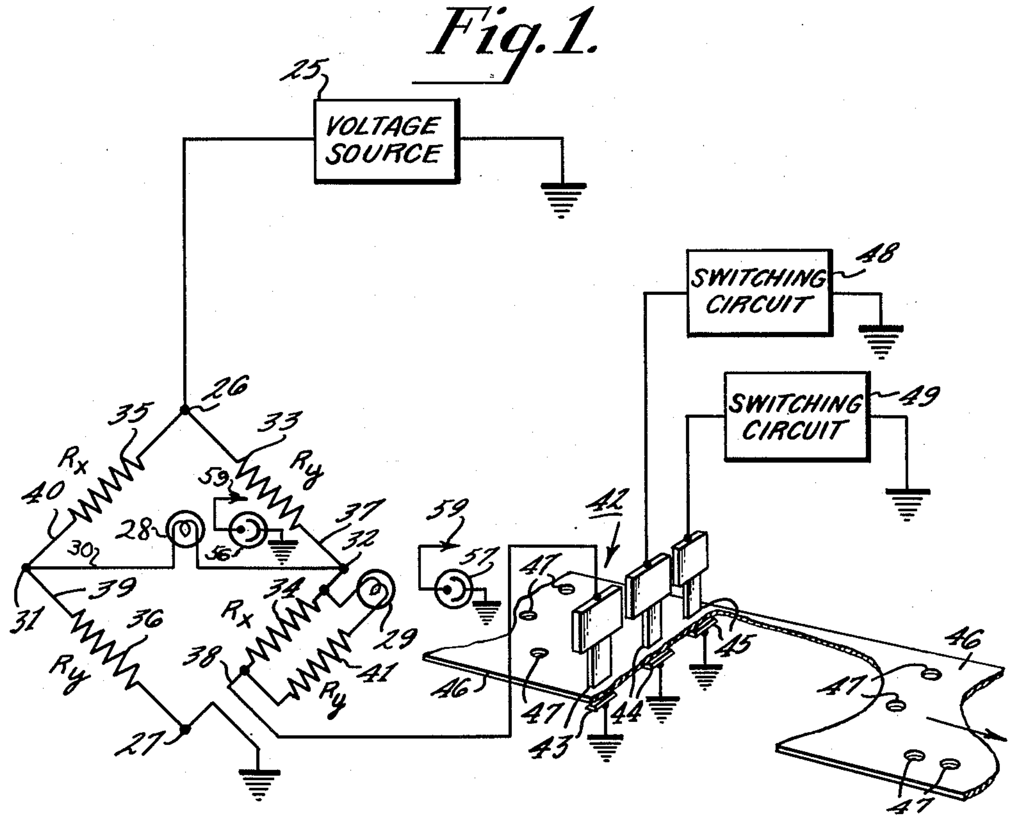
Figure 1 is a schematic diagram of an improved switching circuit.

In Figure 1, an improved switching circuit is provided by the present invention for obtaining substantially instantaneous indications of changes in conditions of associated apparatus. In the illustrative embodiment, the circuit elements to be described are associated together in a bridge-type of circuit. A voltage source 25 of any available type, which is preferably a D.-C. voltage source is connected to one corner 26 of the bridge and to a circuit reference point such as ground. The opposite corner 27 of the bridge is connected to ground. Five impedance elements are used in this bridge circuit. These impedance elements are preferably resistors since it is ordinarily desirable to obtain high speed operation of the switching circuit. A pair of current responsive elements such as incandescent lamps 28 and 29 are employed in this circuit. The detector arm 30 of the bridge that contains one of the lamps 28 is connected between the corners 31 and 32 of the bridge. Resistance elements 33, 34, 35 and 36, are connected in the arms 37, 38, 39 and 40 respectively of the bridge. Oppositely disposed pairs of these arms 39, 40 and 37, 38 may be termed ratio arms of the bridge. Opposite arms 37, 39 and 38, 40 of the bridge may have resistance elements of the same value. The values of these resistance elements are designated $R_x$ and $R_y$. The resistance of the lamps 28 and 29 when warm will be designated by $R_L$. The resistance elements 35 and 33 have values equal to $R_x$ and $R_y$, respectively. The resistance elements 36 and 34 located in the left arm 39 and right arm 38 of the bridge have values equal to $R_y$ and $R_x$ respectively. The other lamp 29 is connected in series with a resistor 41 having a value equal to $R_y$. This lamp 29 and resistor 41 are connected across the resistance element 34 in the arm 38. It may be noted that the value of the resistance element 41 in series with the lamp 29 is not equal to the value of the resistance element 34 across which it is connected. One of these resistance elements namely 34, is chosen to have one of the two resistance values, $R_x$, and the other resistance element 41 is chosen to have the other resistance value $R_y$.

A binary sensing element 42 is located in series with the arm 38 containing the lamp and the parallel resistors. This sensing element 42 is shown illustratively in Figure 2 as a perforated tape analyzing device. Sensing brushes 43, 44 and 45 detect the perforations 47 in the tape. The tape 46 may be moved in the direction shown by the arrow by any tape stepping mechanism, not shown. When the contact brushes encounter a perforation in the tape 46, the circuit to ground is completed. A binary code may be provided in the arrangement of the perforations in the tape 46. Other similar switching circuits 48, 49, similar to the bridge-type circuit described in detail, are connected to the other contact brushes 44 and 45 respectively to illustrate a manner in which a complete switching system may be provided.

A preferred method for utilizing the switching system is to provide photoelectric devices 56 and 57 near each of the lamps in each of the switching circuits. The devices are connected in any known manner to provide signal output terminals indicated schematically at 58 and 59. Electrical signals may, therefore, be derived from these lamps in response to a binary code, and further mechanisms or circuits actuated thereby. Such a perforated tape system may be used for reading in and reading out information from a computing device.

The value of one resistance, $R_x$, for example, may be expressed in terms of the resistance of the lamps $R_L$ which are preferably identical and in terms of the value of the other resistance. The known bridge relationships are employed to derive these values. Accordingly, at balance $$\frac{R_x}{R_y}=\frac{R_y}{\frac{R_x(R_y+R_L)}{R_x+R_y+R_L}}$$

$$R_x=\frac{(R_y)^2}{2(R_y+R_L)}\left[1+\sqrt{5+8\left(\frac{R_L}{R_y}\right)+4\left(\frac{R_L}{R_y}\right)^2}\right]$$

Figure 2:
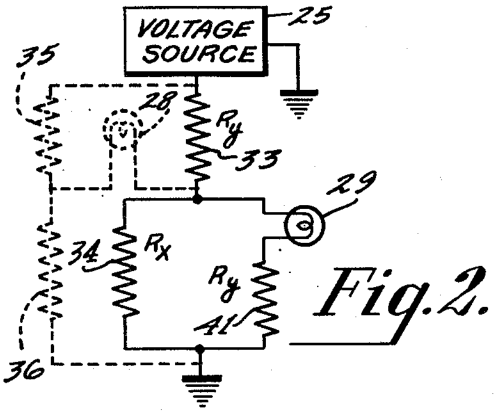
Figure 2 is an equivalent circuit showing the circuit of Figure 1 in one condition of operation thereof.

Figure 2 shows an equivalent circuit for the circuit of Figure 1 at times when the sensing element 42 completes the circuit to ground. The bridge is balanced. Therefore, no voltage appears across the detector arm 30 and the lamp 28 therein is not illuminated. The lamp 28 and the resistances 35 and 36 on the left side on the bridge are shown by dotted lines to point out that they do not have any effect in the equivalent circuit. The complete equivalent circuit in the balanced bridge condition may be seen as the boltage source 25 connected through the upper resistor 33 on the right having a value of $R_y$; the resistor 34 of the value $R_x$ in parallel with the lamp 29 and the other resistor 41 in series with the lamp 29 of value $R_y$. The parallel resistors 34 and 41 of values $R_x$ and $R_y$ respectively are connected together and returned to ground.

Figure 3:
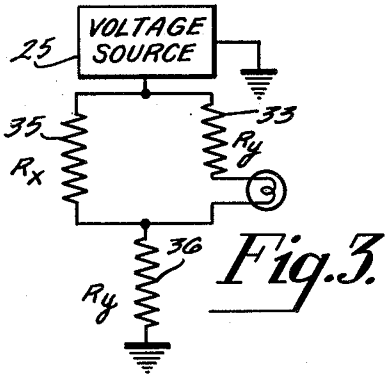
Figure 3 is an equivalent circuit of the circuit of Figure 1 in another condition of operation thereof.

Another equivalent circuit shown in Figure 3 exists when the sensing element 42 is in its open circuit position. For example, this occurs when the perforations 47 do not appear between the contact brushes 43. Tracing the circuit, the voltage source 25 is connected through the resistor 35 to the left and above the detector arm 30; this resistor 35 is now in parallel with the resistor 33 on the right above the detector arm 30 and the lamp 28 in the detector arm 30. The resistor 36 to the left and below the detector arm 30 having a value of $R_y$ completes the circuit to ground. It may be observed from the values of the resistances that the circuits of Figure 2 and Figure 3 are identical. Therefore, equal currents flow through the lamp 28 in the detector arm of the bridge and the lamp 29 in the arm of the sensing element. It may also be observed that the values of the resistances may be reserved without effecting the operation of the bridge. The circuit configuration in the arm having the sensing element precludes complete dependence on the resistance of the lamp 29 to effect the balanced condition of the bridge. It has been found that rapid operation of the bridge is possible with this circuit.

Solely for purposes of example, the following values for the switching circuit have been found effective. The lamp may be a grain-of-wheat General Electric type 327, which has a resistance, $R_L$, of 700 ohms, a heating time of approximately forty milliseconds and a cooling time of approximately ten milliseconds. The potential supplied by the voltage source 25 may be one hundred volts. Equal values of resistances, $R_x$ and $R_y$, may be used without serious unbalance of the bridge circuit if $R_x$ and $R_y$ are arranged to be less than seventy five percent of the value of lamp resistance $R_L$. A value of 500 ohms has been found preferable.

What is claimed is:

1. A circuit for alternately switching on and off each one of a pair of current responsive devices, said circuit comprising a plurality of impedance elements, a bridge circuit having four circuit arms connected to provide pairs of oppositely disposed junction points, said impedance elements being arranged in said bridge circuit arms, means for applying operating potentials across a pair of said oppositely disposed junction points, one of said pair of current responsive devices being connected between the remaining pair of said junction points, a single-pole single-throw switching means, said switching means being series connected in one of said arms, and said other one of said pair of current responsive devices being connected in said arm containing said switching means.

2. In a code analyzing system, a circuit for converting a single binary representation into a pair of alternative binary representations, said circuit comprising a current interrupting device, said current interrupting device being positionable in one of two positions, one of said positions being a circuit interrupting position, the other of said positions being a circuit closing position, a pair of current responsve devices, a bridge circuit having four arms therein, impedance elements in each of said four arms thereof, two pairs of oppositely positioned junctions formed by the interconnections of adjacent ones of said four arms, one of said current responsive devices being connected between one of said pairs of oppositely positioned junctions, said current interrupting device being connected in one of said four arms, said other one of said current responsive devices being connected in shunt relationship with one of said impedance elements in said arm of said bridge circuit containing said current interrupting device, and means to apply operating potentials to said bridge circuit, said potential applying means being connected between said other pair of oppositely positioned junctions.

3. In a code translating system, a sensing element responsive to a binary code by being alternatively positionable in a circuit opening and in a circuit closing position, a first device and a second device, each of said first and second devices having means for providing a response representative of a binary code, a bridge circuit, said bridge circuit having four arms, an impedance element in each of said arms, said sensing element being connected in one of said arms in series with said impedance element therein, said first device being connected in a shunt circuit across said last-named impedance element, adjacent arms of said bridge circuit forming two pairs of oppositely located junctions, one of said junctions being formed by said arm containing said first device and one of the arms of said bridge circuit adjacent thereto, said second device being connected between said last-named junction and a said opposite junction, and means to apply operating potentials to said bridge circuit, said potential applying means being connected to said pair of opposite junctions separate from said junctions connected to said second device.

4. A bridge circuit in a code translation system, according to claim 3, in which the impedance elements in opposite ones of said four arms of said bridge circuit are resistance elements of equal value, and in which a resistance element is connected in series with said first device and is included in said shunt circuit across said resistance element in said arm containing said first device, and said resistance element in series with said first device has a value equal to the value of said impedance element in said adjacent bridge arm.

5. A bridge circuit comprising a sensing element alternatively positionable in a circuit opening or circuit closing position, a pair of current responsive devices, said bridge circuit having four circuit arms connected to provide four junctions, impedance elements connected in each of said arms, one of said current responsive elements being connected between one pair of oppositely located ones of said junctions to form a detector arm of said bridge, said sensing element being included in an arm forming one of said junctions to which said detector arm is connected, said sensing element being connected in series with said impedance element in said last-named junction forming arm, the other of said current responsive devices being connected across said last-named impedance element, and means for applying operating potentials to said bridge connected across said pair of oppositely located junctions separate from said pair of junctions connected to said detector arm.

6. A bridge circuit, according to claim 5, wherein said current responsive elements include lamps, and wherein said sensing element is a current interrupting device.

7. In a binary switching system, a binary sensing element, a circuit containing only passive impedance elements for effecting dual alternative binary responses to each of two positions of said binary sensing element, said circuit comprising at least five impedance elements, two devices responsive to the presence and absence of current therethrough, said sensing element, impedance elements and current responsive elements being arranged in a bridge circuit having four arms, a detector arm between two junction points connecting adjacent ones of said arms, said impedance elements being individually connected in different ones of said arms, said sensing element being connected in series with the impedance element in one of said arms, one of said current responsive elements being connected in series with one of said impedance elements, said last-named series circuit being connected across said impedance element in said arm containing said sensing element, and said other current responsive element being connected in said detector arm of said bridge.

8. In a system, according to claim 7, wherein said impedance elements in said circuit are resistances, and wherein said current responsive elements are lamps.

9. In a binary switching system, a binary sensing element, a circuit for effecting dual alternative binary responses at each of two positions of said binary sensing element, said circuit comprising at least five resistance elements, each of said five resistance elements having one of two values of resistance, two devices that are responsive to the presence and absence of current therethrough by presenting a visible response thereto, said sensing element, resistance elements and current responsive elements being arranged in a bridge circuit having four arms and a detector arm, said detector arm being connected between two junction connections, said juncton connections being formed by oppositely disposed adjacent pairs of said arms, said oppositely disposed adjacent pairs of arms thereby being ratio arms of said bridge, one of said resistance elements being individually connected in different ones of said arms, said value of said resistance element in each arm of each oppositely disposed pair of arms being different, said resistance element in any one of said four arms of said bridge being of different value than the resistance element in an arm adjacent thereto, said sensing element being connected in series with the resistance element in one of said arms, one of said current responsive elements being connected in series with one of said resistance elements having a value of resistance different from the value of said last-named resistance element, said last-named series circuit being connected across said impedance element in said arm containing said sensing element, and said other current responsive element being connected in said detector arm of said bridge.

References Cited in the file of this patent

UNITED STATES PATENTS 2,609,433 Goff ------------------- Sept. 2, 1952